(Model.)

R. J. WELLES.
HARNESS TRIMMING.

No. 249,810. Patented Nov. 22, 1881.

Witnesses—
I. Everett Brown
A. W. Munday.

Inventor—
Richard J. Welles,
per Munday, Evarts & Adcock
his Attys

UNITED STATES PATENT OFFICE.

RICHARD J. WELLES, OF CHICAGO, ILLINOIS, ASSIGNOR TO WARD A. DWIGHT, OF SAME PLACE.

HARNESS-TRIMMING.

SPECIFICATION forming part of Letters Patent No. 249,810, dated November 22, 1881.

Application filed August 8, 1881. (Model.)

*To all whom it may concern:*

Be it known that I, RICHARD J. WELLES, of Chicago, Cook county, in the State of Illinois, have invented certain Improvements in Harness-Trimmings, of which the following is a specification.

This invention, which relates to the manner of attaching terrets and check-hooks to harness, will be fully understood from the following description, as explained by the accompanying drawings, in which latter—

Figure 1:
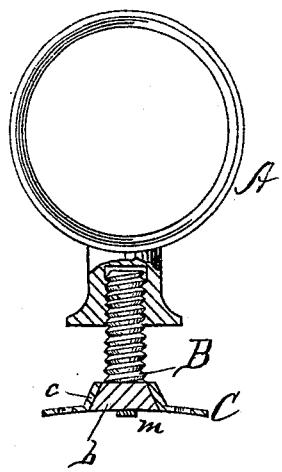
Figure 2:
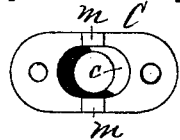
Figure 4:
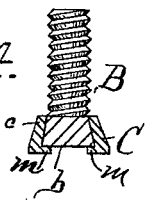
Figure 3:
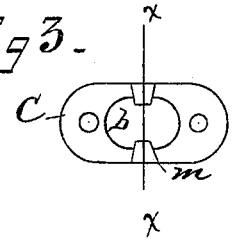

Figure 1 is a side view, partly in section, of a terret and its attaching devices. Fig. 2 is a bottom view of the washer forming part of the attaching devices. Fig. 3 is a like bottom view with the screw-bolt in place in the washer. Fig. 4 is a section of Fig. 3 on the line $x\ x$.

Similar letters of reference indicate like parts wherever used in the drawings.

In said drawings, A represents the ordinary harness-terret. Its shank is hollow and threaded interiorly, so it will receive the correspondingly sized and threaded wrought-iron bolt B, which is inserted from below. This bolt is provided with an oval tapering head, $b$, which fits a corresponding recess in the washer C, formed by flanging the opening for the bolt in said washer. The taper of the head and recess is such as to require the insertion of the bolt from the under side of the washer; but, if preferred, the flanged portion $c$ may be located upon the under instead of the upper side of the washer, and by such change a plain upper surface will be presented to the leather.

The washer I prefer to make of malleable cast-iron, which permits the points $m$, cast upon the under side thereof at either side of the opening, to be hammered down after the bolt has been put through, and serve as catches to hold the same against dropping out, as clearly illustrated by Fig. 4. By this construction the washer, which may be fastened by rivets or otherwise to the leather, is made to take the place of the ordinary burr in the pad, forming, as it does, a base to the screw and a means of attachment to the pad. The construction secures the strength of the wrought bolt over the cast one, and obviates projecting the point of the bolt below the washer, where it may injure the animal, and also renders unnecessary any expensive forging such as would be requisite to make the washer or its equivalent of one piece with the bolt. By the adoption of the oval form for the bolt-head and the washer-opening, the work, both in shaping the head and casting the washer, is rendered more easy and certain than it would be if an angular or sharp-cornered form were adopted.

It will be understood without words of description how to use my invention with a check-hook.

I claim—

1. The combination of a terret or hook having a hollow interiorly-threaded shank, a threaded bolt fitting said shank and provided with an oval tapering head, and a washer having a flanged recess, $c$, corresponding to the bolt-head, substantially as specified.

2. The combination of a terret or hook having a hollow interiorly-threaded shank, a threaded bolt fitting said shank and provided with an oval tapering head, and a washer having a recess corresponding to the bolt-head and the points $m$ upon the under side thereof, substantially as specified.

RICHARD J. WELLES.

Witnesses:
H. M. MUNDAY,
WARD A. DWIGHT.